UNITED STATES PATENT OFFICE.

JOHN S. DUNHAM, OF ST. LOUIS, MISSOURI, ASSIGNOR TO DUNHAM MANUFACTURING COMPANY, OF SAME PLACE.

IMPROVEMENT IN DESICCATED COCOANUT.

Specification forming part of Letters Patent No. 220,359, dated October 7, 1879; application filed April 16, 1879.

*To all whom it may concern:*

Be it known that I, JOHN S. DUNHAM, of St. Louis, Missouri, have invented an Improved Confection, of which the following is a specification.

My invention relates to a new and useful process for curing and concentrating the meat and oil of cocoanuts; and the method by which I accomplish these ends and produce an improved confection will now be more fully described.

In carrying out my invention I first grate or rasp the cocoanut-meats. This done, I place the grated cocoanut-meats within a copper kettle, and to, say, one hundred parts of the said grated meats I add ten parts of glycerine. The kettle with its said contents is kept heated by steam (or other well-known way) from fifteen to twenty-two minutes at a temperature from 185° to 225° Fahrenheit, in order to produce a complete absorption of the glycerine with the cocoanut-meats, also to expel a portion of the moisture. At same time a stirrer is kept operating within the kettle to obtain a more uniform action of the heat upon each and all particles of the mixture. This done, I add two parts of melted paraffine to the contents in the kettle, continuing the stirring and heating process, at a lower degree of heat than above stated, until all the ingredients are thoroughly mixed and coated. Finally, the contents are placed in a drying-room, where it remains until thoroughly dry, when it is ready to pack for the market.

The glycerine possesses the preserving or curative properties. It therefore effectually prevents acidification and retains the oil and valuable properties of the cocoanut-meats.

The paraffine possesses the protective properties; hence forms a desirable coating to exclude and protect the cocoanut-meats from moisture, effects of exposure, or evaporation.

The concentrated cocoanut-meats (or confection) produced by my process, as described, will keep good when shipped in bulk, while that cured by any of the ordinary ways has to be kept in air-tight packages, to keep it from getting rancid during hot weather.

A confection from the meat of cocoanuts is thus produced that retains its original flavor, sweetness, and nutritive properties, that can be kept in said condition an indefinite period of time and in all climates, and therefore is the better serviceable for commercial, mercantile, and household uses and purposes.

I am aware that it is not new to use either glycerine or paraffine separately as a preservative.

What I claim is—

1. The herein-described process, consisting of first combining glycerine with rasped cocoanut-meats, and subjecting both to the action of heat and stirring until a complete absorption of the glycerine has taken place; next applying melted paraffine and continuing the stirring and heating action; finally desiccating the entire contents, as and for the purposes set forth.

2. An improved composition for food, consisting of desiccated cocoanut, glycerine, and paraffine, substantially as set forth.

In testimony of said invention I have hereunto set my hand.

JOHN S. DUNHAM.

Witnesses:
WILLIAM W. HERTHEL,
JOHN W. HERTHEL.